July 18, 1967 R. H. IMMEL 3,331,899
PROCESS AND APPARATUS FOR MAKING SHAPED CELLULAR
ARTICLES FROM EXPANDABLE THERMOPLASTIC RESINS
Filed Nov. 30, 1964

INVENTOR.
RICHARD H. IMMEL.
BY Stanley J Price
his ATTORNEY.

3,331,899
PROCESS AND APPARATUS FOR MAKING SHAPED CELLULAR ARTICLES FROM EXPANDABLE THERMOPLASTIC RESINS
Richard H. Immel, Sewickley, Pa., assignor to Koppers Company, Inc., a corporation of Delaware
Filed Nov. 30, 1964, Ser. No. 414,787
9 Claims. (Cl. 264—26)

This application is a continuation-in-part of copending application Ser. No. 328,305, filed Dec. 5, 1963, now Patent No. 3,278,658, entitled, "Process and Apparatus for Making Shaped Cellular Articles From Expandable Thermoplastic Resins."

This invention relates generally to a method of forming shaped articles from granules of a thermoplastic material and more particularly to a dry process for molding expandable granules of polystyrene into shaped cellular articles.

The making of low density shaped plastic articles from expanded granules or beads of thermoplastic material is well known. Such granules generally contain either a liquid that boils below the softening point of the thermoplastic material or a chemical, or possibly a combination of chemicals that evolve a gas when the granules are heated to their softening point. These unexpanded granules are placed in a mold cavity which defines the shape of the desired finished article. Steam or other suitable heating media is then injected under pressure into the mold cavity to heat the beads or granules above their softening point and cause them to expand and completely fill the mold cavity and fuse together. The above process is sometimes referred to as a wet process because a portion of the steam condenses during the expansion of the granules and the finished article must thereafter be dried.

Copending application Ser. No. 328,305, now Patent No. 3,278,658, entitled "Process and Apparatus for Making Shaped Cellular Articles From Expandable Thermoplastic Resins," is an improvement of the above process in that the granules of the expandable thermoplastic material are entrained in a heated gaseous media as they are conveyed to the mold. The entrained granules are heated by the gaseous media above their softening point but below the temperature where substantial expansion takes place. The heated granules in the mold are thereafter subjected to a vacuum so that the granules expand and fill the mold and fuse together. The improved process described in the above copending application reduces substantially the time cycle for the molding operation. The granules are preheated before they enter the mold so that little, if any, additional heating is required in the mold and drying of the finished article is not required. The description of copending application Ser. No. 328,-305, now Patent No. 3,278,658, is incorporated herein to the extent as may be required for a clear and complete understanding of the invention.

It is a primary object of this invention to provide a process for forming shaped articles from granules of thermoplastic material that is an improvement of the above described process. It has been discovered, where the granules of thermoplastic material are treated to be rendered suitable for dielectric heating, that very rapid dielectric heating of the granules may be accomplished within the mold and a vacuum can be applied to the mold either while the granules are being heated dielectrically or after the granules have reached a desired elevated temperature. The improved process of this invention permits the use of less complicated molding apparatus and provides a means for rapidly heating the thermoplastic granules within the mold. Where it is desired to shape relatively thick molded articles with substantially the same density throughout, the granules can be partially preheated as they are fed to the mold, as is taught in the copending application of which this is a continuation. If desired, so-called partially expanded granules can be fed to the mold for further heating and expansion into a finished article.

The novel process of this invention has the advantage that the time cycle for the molding operation is substantially reduced by the rapid heating of the granules within the mold for expansion into a shaped article. The cooling portion of the time cycle for the molding operation is substantially reduced over known processes by subjecting the mold to a vacuum during the molding operation.

The above and further objects and novel features of this invention will appear more fully from the following detailed description when the same is read in connection with the accompanying drawings. It is to be expressly understood, however, that the drawings are not intended as a definition of the invention, but are for the purpose of illustration only.

Figure 1:
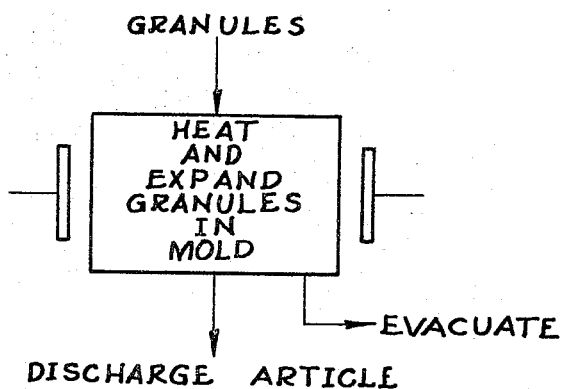
FIGURE 1 is a schematic flow diagram of the improved process.

The novel process of the invention for forming a shaped cellular plastic article is illustrated schematically by the flow diagram of FIGURE 1. The unexpanded or partially expanded polymeric granules are fed to the mold in any suitable manner. The granules can be fed to the mold by entraining the granules in a gas such as air at an elevated temperature. If the granules are entrained in a hot gas, they are heated during entrainment to an elevated temperature, preferably below the softening point of the thermoplastic material. The granules within the mold are heated dielectrically by subjecting the mold and the granules contained therein to a field of high frequency waves. The dielectric heating is very rapid and the heating cycle is relatively short when compared with the heating cycle of the conventional steam process. The mold may be subjected to a vacuum during the heating cycle or the heating cycle may be performed at atmospheric pressures. The granules heated dielectrically to a temperature above the softening point are subjected to a vacuum whereupon the granules expand, coalesce and fuse together to form a shaped foamed cellular mass. The vacuum should be maintained on the mold until the foamed cellular mass has cooled to a self-sustaining surface temperature. The foamed cellular mass is thereafter removed from the mold as a finished article having a foamed structure of uniform density.

Figure 2:
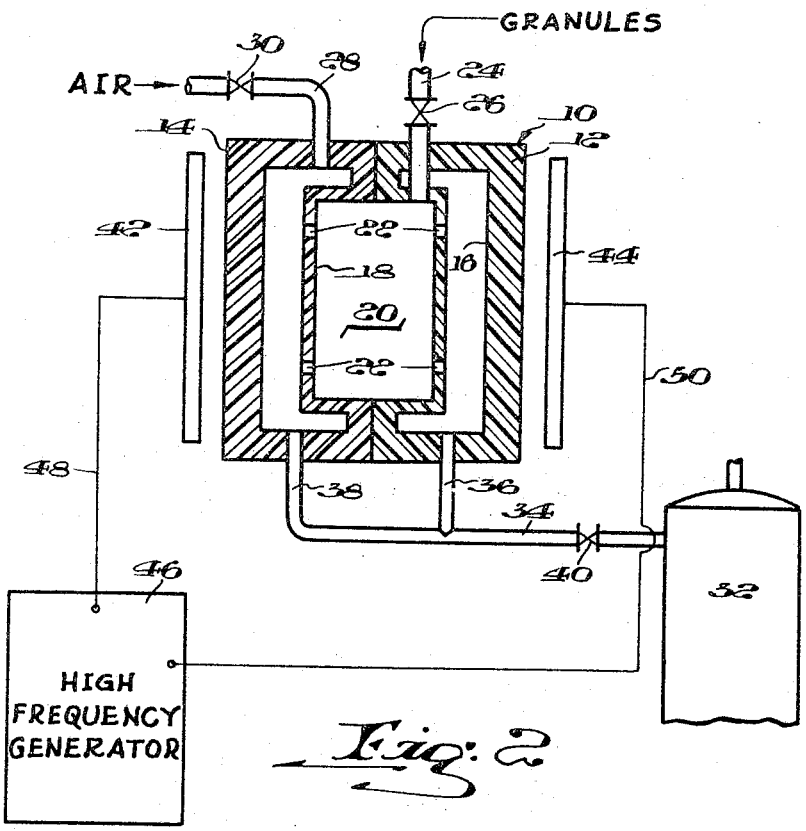
FIGURE 2 is a schematic vertical cross section of the embodiment of a novel apparatus.

In FIGURE 2 there is illustrated apparatus for molding expanded granules into a foamed cellular finished article. The mold generally designated by the numeral 10 is substantially cubic in shape and is constructed in two sections, 12 and 14, that are held in place by any suitable means, such as a press or the like (not shown). The mold 10 is so constructed that it can be opened and closed to eject or remove finished articles therefrom. Suitable gasket means may be provided to form an air tight seal between the mold halves 12 and 14. The mold 10 is preferably constructed of a dielectric material that is transparent to the power applied by high frequency waves and is not heated when positioned in a high frequency field. The mold should be constructed of a low loss factor material to avoid dissipation of the high frequency energy therein and should be sufficiently sturdy to maintain its shape when subjected to a vacuum of between 15–30 inches of mercury. Suitable materials for the mold are glass, quartz, ceramics, polymethacrylates, Teflon, polyester-impregnated glass fibers, silicone-impregnated glass fibers and the like.

The mold 10 has an outer solid shell or enclosure 16 that houses and supports a hollow inner mold 18. The mold 18 is spaced from the walls of the enclosure 16 and has a chamber 20 that has a configuration of the finished molded article. The mold 18 has a plurality of apertures 22 therethrough for the escape of gas from the mold chamber 20 during the expansion of the granules. A conduit 24 extends through the outer enclosure 16 and opens into the chamber 20 of mold 18. The aperture in the enclosure 16 through which the conduit 24 extends is suitably sealed to prevent leakage of air through the aperture around the conduit 24. A valve 26 is positioned in the conduit 24 and in a closed position seals the conduit 24. Granules are fed through conduit 24 into the chamber 20 of the mold 18 and the valve 26 may be suitably actuated to control the amount of unexpanded or partially expanded granules fed therethrough into the chamber 20.

The enclosure 16 has a conduit 28 extending therethrough which opens into the space between the inner walls of the enclosure 16 and the mold 18. A valve 30 is provided in conduit 28 and air under pressure flows through conduit 28 when valve 30 is opened. A vacuum tank 32 is connected to the inner portion of the enclosure 16 by conduits 34, 36, 38. The conduit 34 has a valve 40 that controls the vacuum drawn on the inner portion of the enclosure 16.

A pair of heating electrodes 42 and 44 are positioned adjacent to the walls of the enclosure 16 in spaced relationship thereto and are connected to a high frequency generator 46 by conductors 48 and 50. The high frequency generator unit 46 is of the conventional type, and a unit of the type known as a "Thermal Electronic Heat Generator," manufactured by W. T. La Rose and Associates, Incorporated, of Troy, N.Y., is suitable for use in this process.

In practice, the mold 10 is closed and suitably maintained in a closed position. Valve 30 in air conduit 28 and valve 40 in vacuum conduit 34 are closed. Valve 26 in the granule supply conduit 24 is opened and granules are supplied through conduit 24 into the chamber 20 of mold 18. The valve 26 is closed and the high frequency generator 46 energized to generate a high frequency field between the electrodes 42 and 44. The high frequency energy is accepted by the granules within the mold chamber 20 and the granules are heated dielectrically to temperatures slightly above the softening point of the plastic material.

If desired, during the heating cycle, when the high frequency generator is energized, the valve 40 in conduit 34 may be opened to subject the inner portion of the enclosure 16 to a vacuum of between 15 to 30 inches of mercury. Upon being subjected to a vacuum while at the elevated temperature, the granules expand and fuse together to form a cellular plastic article. As soon as the granules are heated to a temperature slightly above their softening point the high frequency generator 46 is de-energized.

The vacuum is maintained on the enclosure 16 until the cellular plastic article surface has cooled to a temperature where the surface of the article has sufficient rigidity to be self sustaining. Thereafter the valve 30 is opened to supply air to the enclosure 16 and further cool the surface of the cellular plastic article. The finished article is thereafter removed from the mold 20.

The expandable polymeric granules fed to the mold chamber 20 may be either polymer beads which have not been expanded, or preexpanded beads (beads which have been partially expanded as, for example, described in U.S. Patent #3,023,175). If it is desired, the expandable polymeric granules may be preheated to a temperature below their softening point by the process described in copending application Ser. No. 328,305, now Patent No. 3,278,658, of which the instant application is a continuation-in-part.

Expandable polymers suitable for use in making cellular articles in accordance with this invention include polystyrene, polyethylene, polypropylene, alkyl-substituted styrene, polyacrylic esters and polymethacrylic esters; copolymers of styrene and alphamethyl styrene, copolymers of styrene and alkyl-substituted styrene. These expandable polymeric materials are characterized by a low power loss factor, perhaps because of the general symmetry of their molecular structure. The polymeric material may be rendered suitable for dielectric heating by treating or covering the polymeric materials with a high power loss factor material as is described in U.S. Patent No. 2,998,501.

The expandable polymers preferred for use with the process of this invention are polystyrene and its copolymers. It has been found that the presence of hydroxy groups increases the power loss of a polystyrene composition; thus, wetted polystyrene has a higher loss factor than dry polystyrene. The presence of hydroxy groups in a polystyrene composition can be accomplished by mixing a cellulosic material with the styrene monomer and then polymerizing the monomer to polystyrene. This can then be rendered expandable in the conventional manner. As an example of the foregoing, wood flour, for example that sold under the trade name "Solka-floc," may be added to the styrene monomer to the extent of 10% by weight of the total composition and the monomer polymerized to polystyrene. Other cellulosic materials such as walnut shell flour may be used. Another approach is to polymerize the styrene with a polymerizable monomer having a plurality of hydroxy groups thereon, for example 5–30 parts by weight trimethylolpropane monoallyl ether. This ether has the structural formula:

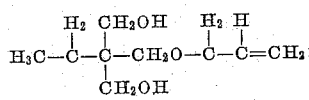

may be polymerized with from 95–70 parts of styrene monomer to produce a copolymer having a high loss factor. A blowing agent is incorporated in the resulting polymer or copolymer in a conventional manner. A suitable process for producing expandable styrene polymers is described in U.S. Patent No. 2,983,692.

The practice of the invention permits shaped foamed cellular plastic articles having uniform density throughout to be molded rapidly in relatively inexpensive molding apparatus. The heating cycle of the molding operation is reduced substantially by subjecting the granules to dielectric heating within the mold cavity. The molded article when removed from the mold is completely dry, thus eliminating the presently practiced drying operation now required.

According to the provisions of the patent statutes, the principle, preferred construction, and mode of operation of the invention have been explained and what is considered to represent its best embodiment has been illustrated. However, it should be understood that, within the scope of the appended claims, the invention may be practiced otherwise than as specifically illustrated and described.

I claim:
1. A method of forming a shaped foamed cellular thermoplastic article comprising
  feeding granules of an expandable thermoplastic material containing an additive to impart a high power loss factor at a temperature below the softening point of said thermoplastic material to a chamber that defines the shape of the foamed article,
  subjecting said granules in said chamber to high frequency electrical energy to heat said granules to a temperature from 5 to 10° F. above the softening point of said thermoplastic material,
  subjecting said heated granules in said chamber to a vacuum of 15–30 inches of mercury so that said granules expand and fuse together to form a shaped cellular foamed thermoplastic article conforming to said chamber, and thereafter removing said shaped cellular thermoplastic article from said chamber.

2. The method of claim 1 in which said additive is a copolymerized constituent of said thermoplastic material.

3. The method of claim 1 in which said additive is physically mixed with said thermoplastic material.

4. A method of forming a shaped foamed cellular thermoplastic article comprising feeding granules of an expandable thermoplastic material containing an additive to impart a high power loss factor at a temperature below the softening point of said thermoplastic material to a chamber that defines the shape of the foamed article, subjecting said granules in said chamber to high frequency electrical energy to heat said granules to a temperature from 5 to 10° F. above the softening point of said thermoplastic material, subjecting said heated granules in said chamber to a vacuum of 15–30 inches of mercury so that said granules expand and fuse together to form a shaped foamed cellular thermoplastic article conforming to said chamber, cooling said cellular thermoplastic article in said chamber, and thereafter removing said shaped foamed cellular thermoplastic article from said chamber.

5. A method of forming a shaped foamed cellular thermoplastic article comprising feeding granules of the polymerized product of 5–30 parts by weight trimethylolpropane monoallyl ether and 95–70 parts of styrene monomer at a temperature below the softening point of said thermoplastic material to a chamber that defines the shape of the foamed article, subjecting said granules in said chamber to high frequency electrical energy to heat said granules to a temperature from 5 to 10° F. above the softening point of said polymerized product, subjecting said heated granules in said chamber to a vacuum of 15–30 inches of mercury so that said granules expand and fuse together to form a shaped foamed cellular thermoplastic article conforming to said chamber, maintaining a vacuum in said chamber until said cellular plastic article has cooled to a temperature where the surface of the article has sufficient rigidity to be selfsustaining, and thereafter removing said shaped foamed cellular thermoplastic article from said chamber.

6. A method of forming a shaped foamed cellular thermoplastic article comprising feeding granules of the polymerized product of 5–30 parts by weight trimethylolpropane monoallyl ether and 95–70 parts of styrene monomer at a temperature below the softening point of said thermoplastic material to a chamber that defines the shape of the foamed article, subjecting said granules in said chamber to high frequency electrical energy to heat said granules to a temperature from 5 to 10° F. above the softening point of said polymerized product, subjecting said heated granules in said chamber to a vacuum of 15–30 inches of mercury so that said granules expand and fuse together to form a shaped foamed cellular thermoplastic article conforming to said chamber, maintaining a vacuum in said chamber until said cellular plastic article has cooled to a temperature where the surface of the article has sufficient rigidity to be selfsustaining, thereafter subjecting said chamber to air under pressure to further cool said cellular thermoplastic article, and thereafter removing said shaped foamed cellular thermoplastic article from said chamber.

7. Apparatus for forming a shaped foamed cellular thermoplastic article comprising a mold having an internal chamber corresponding to that of the shaped foamed article, means for supplying granules of an expandable thermoplastic material containing an additive to impart a high power loss factor to said chamber, means for subjecting said chamber to high frequency electrical energy to heat the ganules within said chamber, and means for subjecting said chamber to a vacuum of between 15 and 30 inches of mercury.

8. Apparatus for forming a shaped foamed cellular thermoplastic article comprising a mold having an internal chamber corresponding to that of the shaped foamed article, means for supplying granules of an expandable thermoplastic material containing an additive to impart a high power loss factor to said chamber, means for subjecting said chamber to high frequency electrical energy to heat the granules within said chamber, means for subjecting said chamber to a vacuum of between 15 and 30 inches of mercury, and means to cool the shaped foamed cellular thermoplastic article in said mold.

9. Apparatus for forming shaped foamed cellular thermoplastic articles comprising, a mold comprising walls having an internal configuration corresponding to that of the foamed cellular thermoplastic article, said walls having apertures therein, an enclosure surrounding said mold, means to supply granules of an expandable thermoplastic material, containing an additive to impart a high power loss factor, to the internal portion of said mold, means for subjecting said mold and said enclosure to high frequency electrical energy to heat the expandable thermoplastic granules, means for subjecting said mold to a vacuum, and means for supplying air under pressure to said enclosure to cool said shaped foamed articles in said mold.

References Cited

UNITED STATES PATENTS

| | | | |
|---|---|---|---|
| 2,983,692 | 5/1961 | D'Alelio | 260—2.5 |
| 2,998,501 | 8/1961 | Edberg et al. | 264—26 XR |
| 3,015,851 | 1/1962 | Wiles | 264—53 |
| 3,065,500 | 11/1962 | Berner | 264—53 XR |
| 3,162,704 | 12/1964 | Attanasio et al. | 264—53 |
| 3,242,238 | 3/1966 | Edberg et al. | 264—53 XR |

ALEXANDER H. BRODMERKEL, *Primary Examiner.*

P. E. ANDERSON, *Assistant Examiner.*